United States Patent [19]

Wakiyama et al.

[11] Patent Number: 4,882,503
[45] Date of Patent: Nov. 21, 1989

[54] METHOD OF CORRECTING A DEAD TIME

[75] Inventors: Yoshihiro Wakiyama; Takeshi Aoyama; Yoshiro Ohnishi, all of Kyoto, Japan

[73] Assignee: Horiba, Ltd., Kyoto, Japan

[21] Appl. No.: 248,248

[22] Filed: Sep. 19, 1988

Related U.S. Application Data

[63] Continuation-in-part of Ser. No. 22,873, Mar. 6, 1987, abandoned.

[30] Foreign Application Priority Data

Mar. 17, 1986 [JP] Japan .................................. 61-60436

[51] Int. Cl.⁴ ........................ H03K 5/04; H03K 5/153
[52] U.S. Cl. .................................... 307/267; 307/261; 307/494; 328/58
[58] Field of Search ............... 307/491, 494, 261, 265, 307/267, 362; 328/28, 58

[56] References Cited

U.S. PATENT DOCUMENTS

| 3,965,471 | 6/1976 | Haeuszer | 307/265 |
| 4,278,061 | 7/1981 | Werner et al. | 307/267 |

FOREIGN PATENT DOCUMENTS

| 0107912 | 6/1985 | Japan | 307/276 |
| 483778 | 12/1975 | U.S.S.R. | 307/273 |

Primary Examiner—John Zazworsky
Attorney, Agent, or Firm—Wenderoth, Lind & Ponack

[57] ABSTRACT

A method of correcting a dead time in an analog/digital converter or a linear amplifier in which a time, which is obtained by adding a time, from a predetermined level to a peak of an output generated by a slow amplifier after an input of a pulse signal from a first amplifier, to a time required for treating an output signal from said slow amplifier, is used as a dead time to reduce a correcting error.

3 Claims, 6 Drawing Sheets

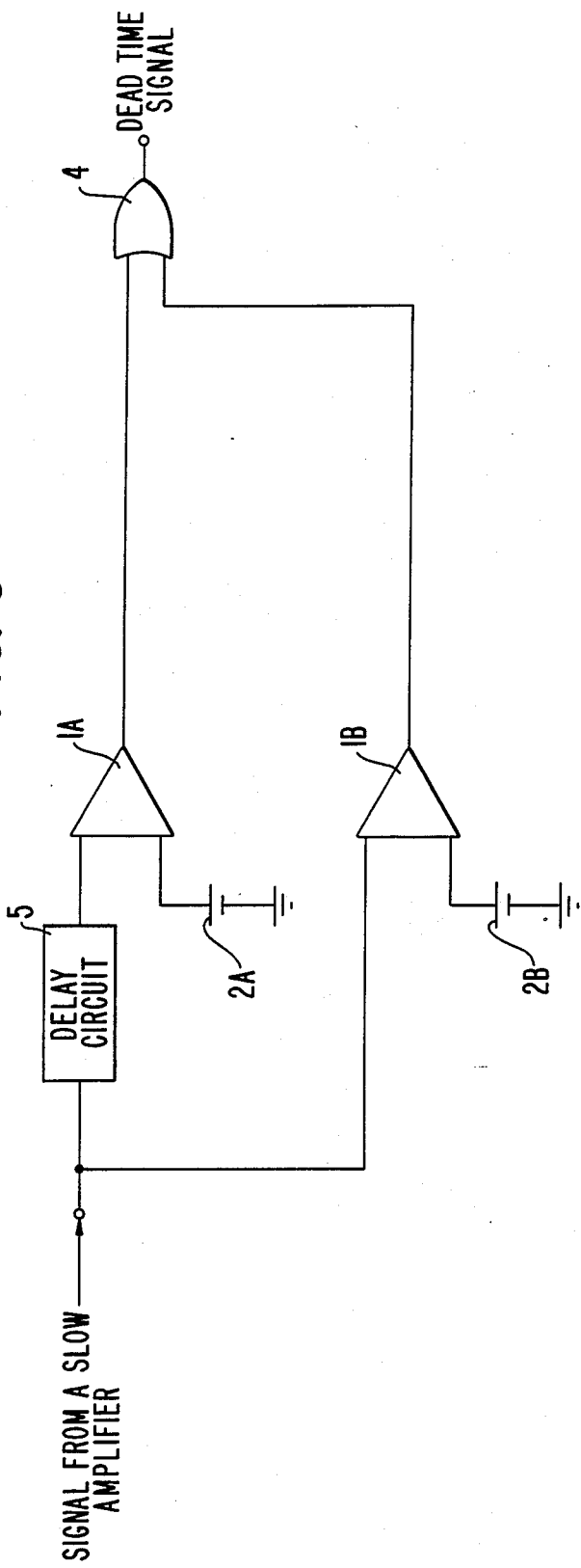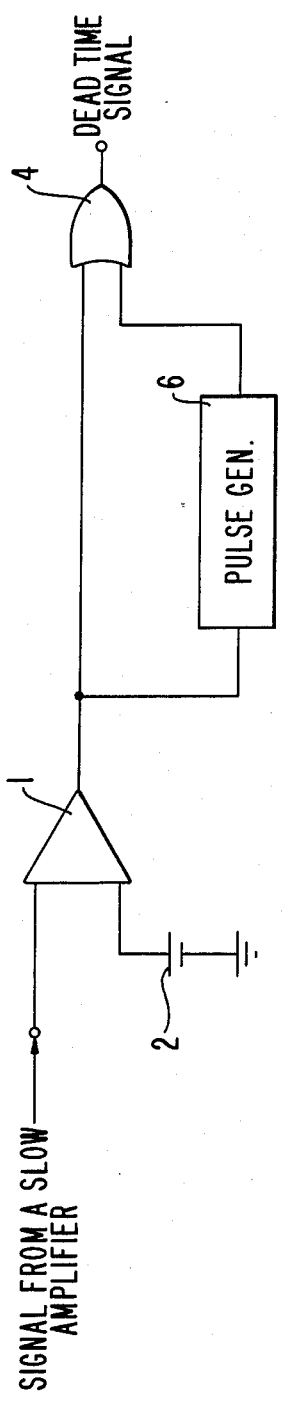

METHOD OF CORRECTING A DEAD TIME

This application is a continuation-in-part of now abandoned application Ser. No. 07/022,873 filed Mar. 6, 1987 abandoned.

BACKGROUND OF THE INVENTION

1. Field of the Invention

The present invention relates to a method of correcting a dead time in an analog/digital converter (hereinafter called an A/D converter for brevity) or a linear amplifier used in a pulse wave-height analyzer, etc., which have been frequently used in fields such as the radioactive instrumentation field.

2. Description of the Prior Art

According to an old method of correcting a dead time, as shown in FIG. 8, a dead time had been corrected by using a time equal to a time $T_c$, required for treating an output signal B generated by a slow amplifier after a pulse signal A from a first amplifier was input, as a dead time $t_D$ and by stopping a timer used for determining a measuring time during the dead time $t_D$. However, according to this old method, as shown in the experimental results of FIG. 10, a disadvantage had occurred in that a dead-time correcting error is remarkably increased with an increase in the counting-rate, whereby the method can hardly be put into practice.

In view of the above, recently a method of correcting a dead time has been proposed in which a correcting operation of keeping a timer used for determining a measuring time stopped until a further subsequent pulse is input in the event that a "leading pile-up" phenomenon occurs, in which a subsequent pulse is input to the slow amplifier before an output signal which is generated by the slow amplifier in response to a previous input pulse has reached its peak, as shown in FIG. 9, in addition to the above described old method. However, also according to such conventional methods, the improvement of a dead-time correcting error has been still insufficient, as is shown in the experimental results of said FIG. 10.

SUMMARY OF THE INVENTION

An object of the present invention is to provide a method of correcting a dead time which is capable of remarkably reducing a dead-time correcting error.

In order to achieve the above described object, a method of correcting a dead time according to the present invention is characterized by adopting a means in which a dead time $T_D$ corresponding to a time $T_c + T_p$, which is obtained by adding the time $T_p$ from a predetermined level to a peak of an output signal B which is generated by the slow amplifier after a pulse signal A from a first amplifier is input thereto to the time $T_c$ required for treating said output signal B, as shown in FIG. 1, in an analog/digital converter or a linear amplifier.

A method according to the present invention was achieved on the basis of the following considerations:

That is to say, taking conditions of a preceding pulse P0 and a subsequent pulse P1, for allowing a certain input pulse P from the first amplifier to be unaffected into consideration, as shown in FIG. 2, prior to the input pulse P, the A/D converter or the linear amplifier does not process a subsequent pulse P during the time $T_c$ required for treating the output signal from the slow amplifier corresponding to the preceding pulse P0 while after the generation of the input pulse P, upon the input of the subsequent pulse P1, for the time $T_p$ from a predetermined level to a peak of the output signal of the slow amplifier corresponding to the pulse P, a "leading pile-up" phenomenon occurs, so that the time $T_c$ required for treating the output signal of the slow amplifier should not be used as a true dead time as in the conventional method but a time $T_D (=T_c+T_p)$ corresponding to a sum of the signal-treating time $T_c$ and the time $T_p$ is preferably used as the true dead time.

The effects exhibited by the adoption of the above described characteristical means are as follows:

That is to say, as shown in FIG. 3, also in the event that the "leading pile-up" phenomenon occurs, in which the subsequent pulse is input before the output signal of the slow amplifier has reached its peak, the dead time $T_D$ is over at a point of time when said additional time $T_p$ has passed from the treating time of the leading piled-up signal, so that an adequate correction of the dead time becomes possible instead of the conventional approximate correction in which a timer is used for determining a measuring time. Thus, as obvious from the experimental results as shown in FIG. 4, the dead-time correcting error can be remarkably improved. In addition, the correction of a dead time according to a method of the present invention defined in the above described manner, can be put into practice by a remarkably simple circuit construction, as obvious from a preferred embodiment which will be described later.

BRIEF DESCRIPTION OF THE DRAWINGS

FIG. 6 is a circuit block diagram for carrying out a method according to a second preferred embodiment of the present invention;

FIG. 7 is a circuit block diagram for carrying out a method according to a third preferred embodiment of the present invention; and in addition, the technical background of a method according to the present invention as well as the problems in the old art and the conventional art are explained in FIGS. 8 to 10, in which

DESCRIPTION OF THE PREFERRED EMBODIMENT

Figure 5:
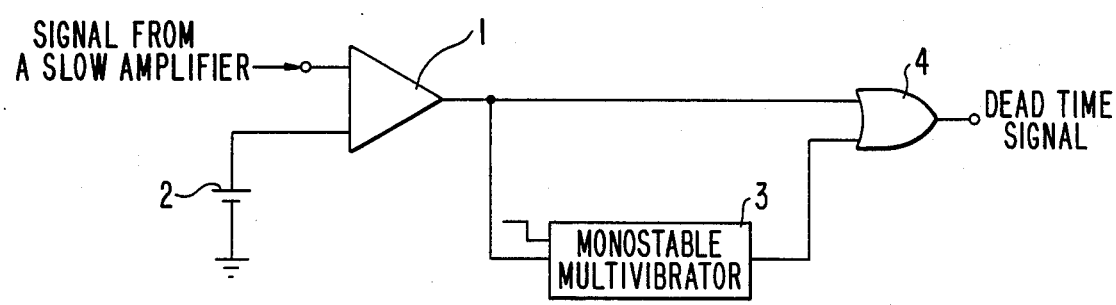
FIG. 5 is a circuit block diagram for carrying out a method according to a first preferred embodiment of the present invention.
Figure 8:
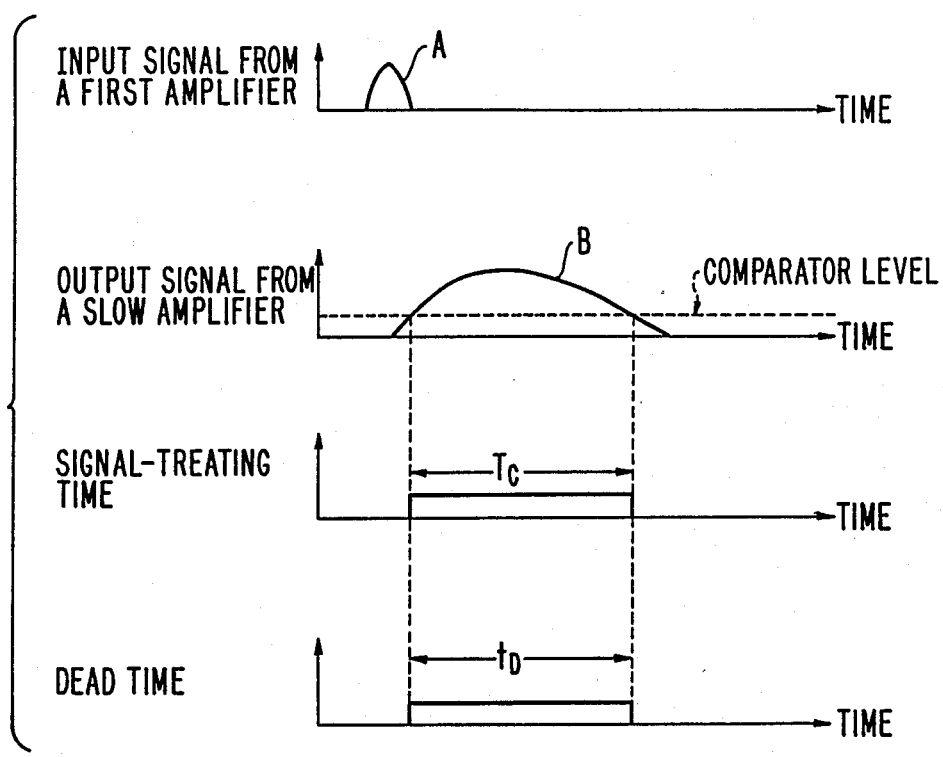
FIG. 8 is a timing-chart for explaining the old method.
Figure 10:
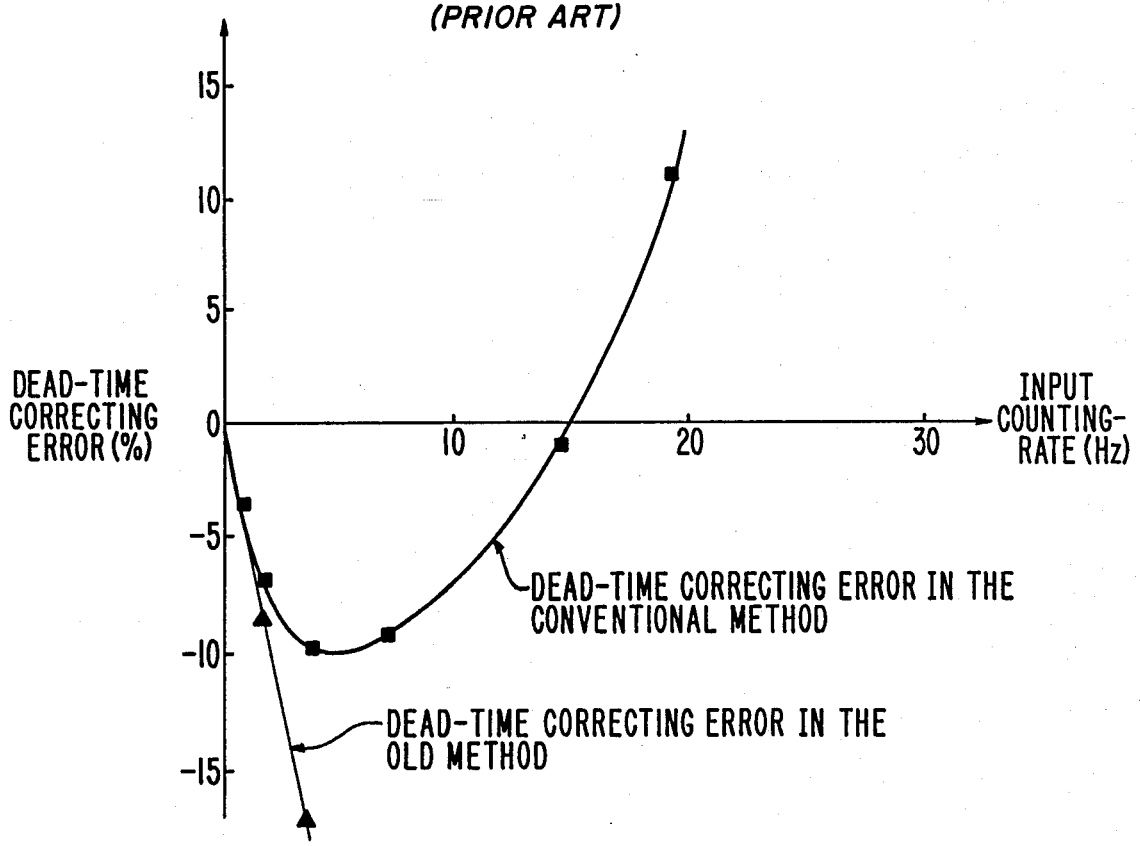
FIG. 10 is a graph of examples of the experimental results showing dead-time correcting error characteristics in the old method and the conventional method.
Figure 9:
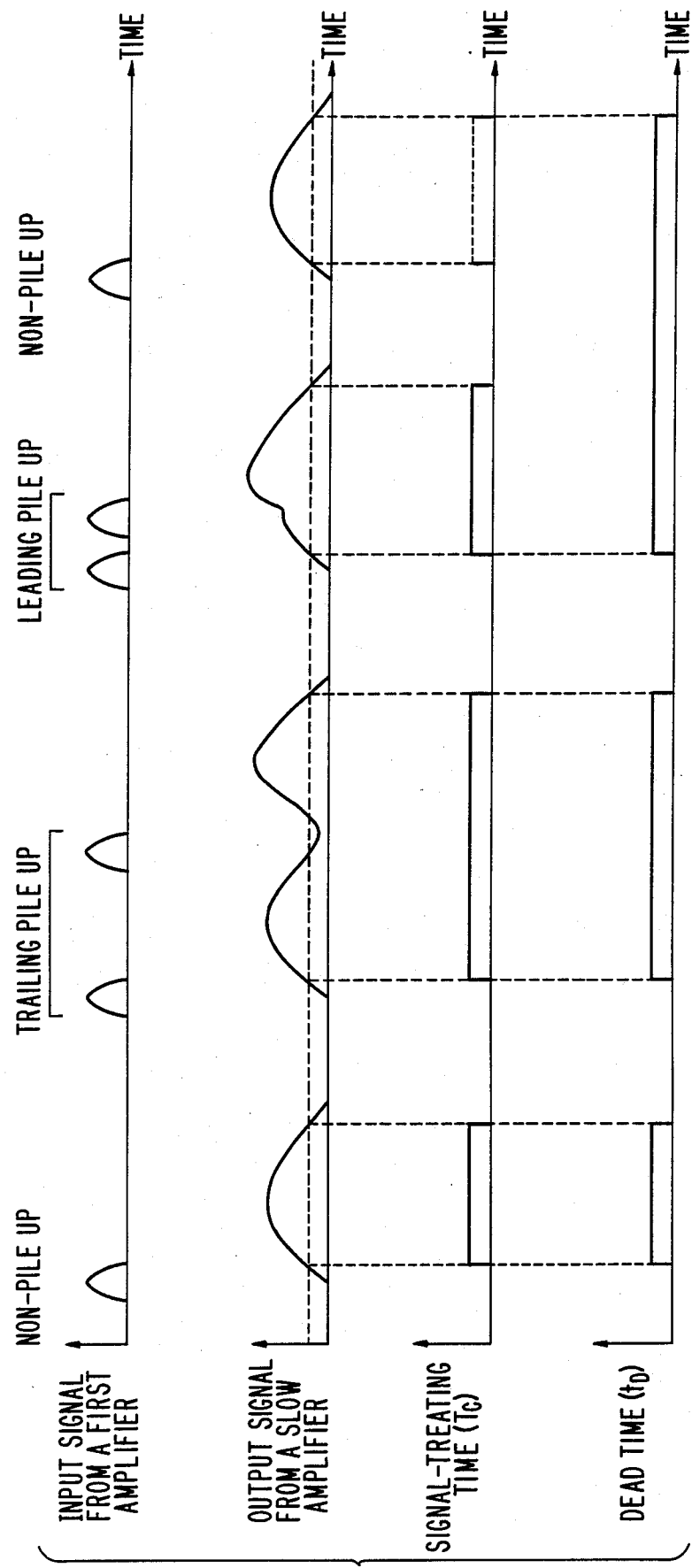
FIG. 9 is a timing-chart for explaining the conventional method.

Various preferred embodiments of a method of correcting a dead time according to the present invention are described below with reference to the circuit diagrams as shown in FIGS. 5 to 7.

In each of the embodiments shown in FIGS. 5 to 7 a representative time Tp is determined in advance of circuit design. Such a representative value Tp may be approximated, or estimated more accurately by testing a sufficient sample of signals.

Figure 1:
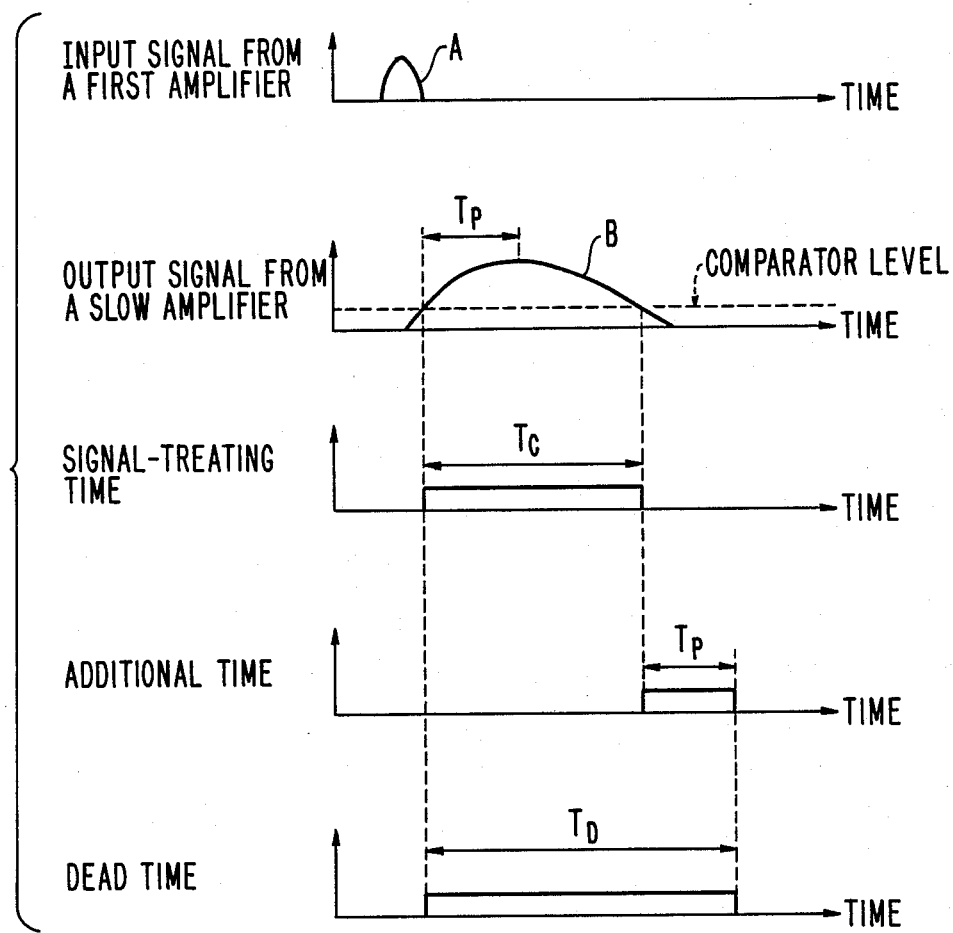
FIG. 1 is a timing-chart for explaining a method of correcting a dead time according to the present invention.
Figure 2:
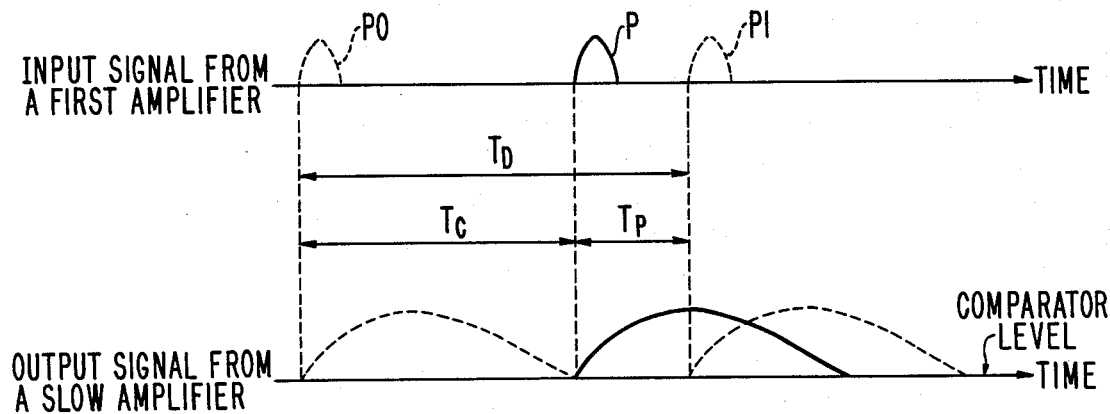
FIG. 2 is a schematic timing-chart for explaining a basic idea of a method of correcting a dead time according to the present invention.
Figure 3:
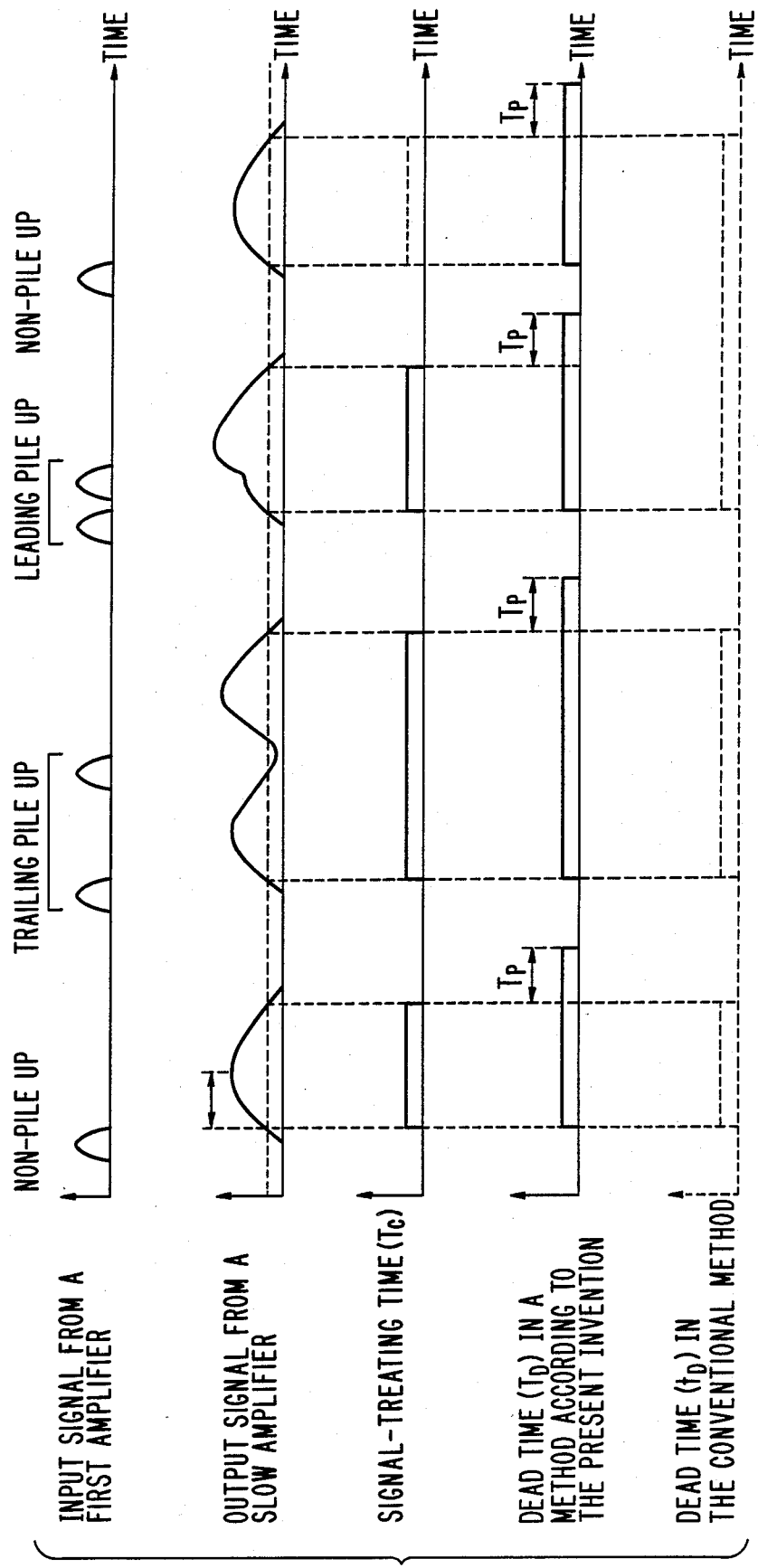
FIG. 3 is a timing-chart for explaining an operation of a method of correcting a dead time according to the present invention.

Referring to FIG. 5 which is a circuit diagram for carrying out a method according to the first preferred embodiment, a signal from a slow amplifier and a comparator level signal from a threshold power source 2 are input to a comparator 1 which outputs a signal of a signal-treating time $T_c$ as shown in FIG. 1; a signal of an additional time $T_p$ as shown in FIG. 1 is generated by means of a one-shot (monostable) multivibrator 3 by a trailing edge of the signal-treating time signal, and both signals are input to an OR gate to be added, whereby a signal of a dead time $T_D$ as shown in FIG. 1 is obtained.

Referring to FIG. 6 which is a circuit diagram for carrying out a method according to the second preferred embodiment, a signal from a slow amplifier is input to a first comparator 1A through a delay circuit 5; a comparator level signal from a first threshold power source 2A is also input thereto and signal of the signal-treating time $T_c$ as shown in FIG. 1 is output; the signal from the slow amplifier is also directly input to a second comparator 1B, in which a comparator level signal from a second threshold power source 2B is input thereto so as to generate the signal of the additional time $T_p$ as shown in FIG. 1 prior to the generation of the signal of the signal-treating time $T_c$ by first comparator 1A, and both signals are input to the OR gate 4 to be added, whereby the signal of the dead time $T_D$ as shown in FIG. 1 is obtained.

Referring to FIG. 7 which is a circuit diagram for carrying out a method according to the third preferred embodiment, a pulse generator 6 utilizing an analog memory or a digital memory is used in place of the one-shot multivibrator 3 used in the first preferred embodiment, the additional time $T_p$ as shown in said FIG. 1 being previously stored in the pulse generator 6, and an output signal from the pulse generator 6 and the signal of the signal-treating time $T_c$ output from the comparator 1 being added by means of the OR gate 4.

Figure 4:
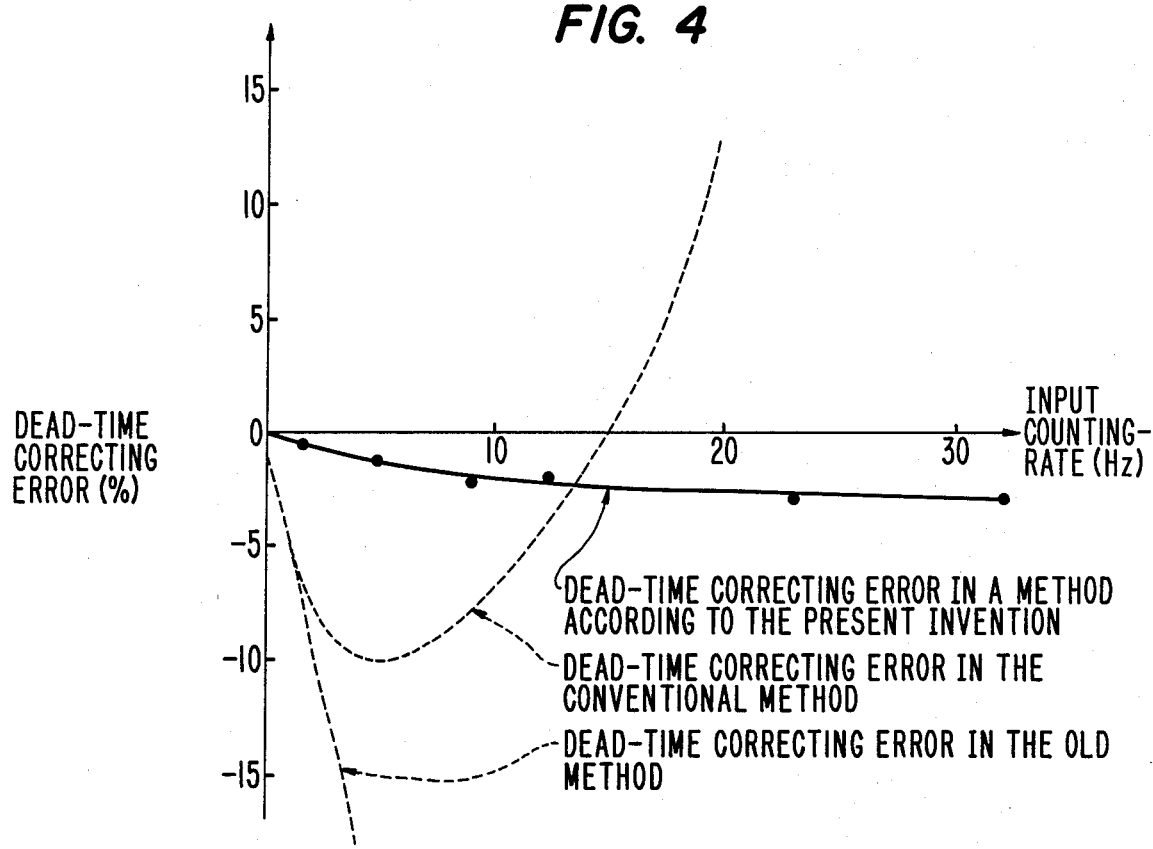
FIG. 4 is a graph showing examples of the experimental results for explaining the effects of a method of correcting a dead time according to the present invention.

As obvious from the above described detail description, according to a method of correcting a dead time of the present invention, a circuit construction is relatively simple, that is to say a time corresponding to a time, which is obtained by adding a time $T_p$, from a predetermined level to a peak of an output signal generated by a slow amplifier after an input of a pulse signal from a first amplifier, to a time required for treating said output signal, is used as a dead time in an analog/digital converter or a linear amplifier. Moreover, superior effects can be exhibited in that even in the event that a leading pile-up phenomenon is generated, a subsequent input pulse can be effectively treated without being wasted as in the conventional methods and accordingly, as obvious from the experimental results as shown in said FIG. 4, a dead-time correcting error can be remarkably improved.

What is claimed is:

1. A method of correcting a dead time in an analog/digital converter or a linear amplifier, wherein said dead time is obtained by the steps comprising;
   determining a first time, wherein said first time represents the time elapsed from (a) a predetermined level of an output signal generated by a slow amplifier in response to an input pulse, to (b) a peak level of said output signal;
   measuring a second time, wherein said second time is the time required for treating said input pulse;
   adding said first time to said second time, thereby obtaining said dead time.

2. A method of correcting a dead time, wherein said dead time is obtained by the steps comprising:
   inputting a signal from a slow amplifier into a comparator;
   inputting a threshold level signal into said comparator,
   wherein said comparator outputs a signal-treating time signal;
   inputting said signal-treating time signal into a one-shot multivibrator;
   adding said signal-treating time signal to an output of said one-shot multivibrator, thereby obtaining said dead time.

3. A method of correcting a dead time, wherein said dead time is obtained by the steps comprising:
   inputting a signal from a slow amplifier into a first comparator through a delay circuit;
   inputting a first threshold value into said first comparator;
   wherein said first comparator outputs a signal-treating time signal;
   inputting directly said signal from said slow amplifier into a second comparator;
   inputting a second threshold value into said second comparator,
   wherein said second comparator outputs an additional time signal prior to said signal-treating time signal by said first comparator;
   adding said signal-treating time signal to said additional time signal, thereby obtaining said dead time.

* * * * *